US012211414B2

(12) United States Patent
Hack et al.

(10) Patent No.: US 12,211,414 B2
(45) Date of Patent: Jan. 28, 2025

(54) DISPLAY CORRECTION SCHEME USING AN UNDER-DISPLAY CAMERA

(71) Applicant: Universal Display Corporation, Ewing, NJ (US)

(72) Inventors: Michael Hack, Carmel, CA (US); Michael Stuart Weaver, Princeton, NJ (US)

(73) Assignee: Universal Display Corporation, Ewing, NJ (US)

( * ) Notice: Subject to any disclaimer, the term of this patent is extended or adjusted under 35 U.S.C. 154(b) by 0 days.

(21) Appl. No.: 17/382,412

(22) Filed: Jul. 22, 2021

(65) Prior Publication Data

US 2022/0059003 A1 Feb. 24, 2022

Related U.S. Application Data

(60) Provisional application No. 63/068,302, filed on Aug. 20, 2020.

(51) Int. Cl.

*G09G 3/20* (2006.01)
*G09G 3/3208* (2016.01)

(52) U.S. Cl.

CPC ......... *G09G 3/2003* (2013.01); *G09G 3/3208* (2013.01); *G09G 2320/041* (2013.01); *G09G 2320/043* (2013.01); *G09G 2370/06* (2013.01)

(58) Field of Classification Search

None

See application file for complete search history.

(56) References Cited

U.S. PATENT DOCUMENTS

| | | | |
|---|---|---|---|
| 4,769,292 | A | 9/1988 | Tang |
| 5,247,190 | A | 9/1993 | Friend |
| 5,703,436 | A | 12/1997 | Forrest |
| 5,707,745 | A | 1/1998 | Forrest |
| 5,834,893 | A | 11/1998 | Bulovic |
| 5,844,363 | A | 12/1998 | Gu |
| 6,013,982 | A | 1/2000 | Thompson |
| 6,087,196 | A | 7/2000 | Sturm |
| 6,091,195 | A | 7/2000 | Forrest |
| 6,097,147 | A | 8/2000 | Baldo |
| 6,294,398 | B1 | 9/2001 | Kim |

(Continued)

FOREIGN PATENT DOCUMENTS

| | | | |
|---|---|---|---|
| WO | 2008057394 | A1 | 5/2008 |
| WO | 2010011390 | A2 | 1/2010 |

OTHER PUBLICATIONS

Baldo et al. Highly efficient phosphorescent emission from organic electroluminescent devices, Nature, vol. 395, pp. 151-154, 1998.

(Continued)

*Primary Examiner* — Benjamin C Lee
*Assistant Examiner* — Emily J Frank
(74) *Attorney, Agent, or Firm* — Butzel Long

(57) ABSTRACT

Embodiments of the disclosed subject matter provide a device that includes a full color display. A camera may be disposed below the full color display. A controller may modify a video signal applied to one or more sub-pixels of the full color display based on a predicted degradation of the one or more sub-pixels, such that the modification is updated by the controller based on luminance data for the one or more subpixels acquired by the camera.

20 Claims, 3 Drawing Sheets

(56) References Cited

U.S. PATENT DOCUMENTS

| | | | | |
|---|---|---|---|---|
| 6,303,238 | B1 | 10/2001 | Thompson | |
| 6,337,102 | B1 | 1/2002 | Forrest | |
| 6,414,661 | B1 * | 7/2002 | Shen | G09G 3/3208 345/82 |
| 6,456,016 | B1 * | 9/2002 | Sundahl | G09G 3/3208 345/98 |
| 6,468,819 | B1 | 10/2002 | Kim | |
| 7,279,704 | B2 | 10/2007 | Walters | |
| 7,431,968 | B1 | 10/2008 | Shtein | |
| 7,968,146 | B2 | 6/2011 | Wagner | |
| 10,163,388 | B2 | 12/2018 | Zhang | |
| 11,145,249 | B1 * | 10/2021 | Han | G09G 3/32 |
| 2003/0230980 | A1 | 12/2003 | Forrest | |
| 2004/0174116 | A1 | 9/2004 | Lu | |
| 2013/0321361 | A1 * | 12/2013 | Lynch | G09G 3/3225 345/204 |
| 2016/0351094 | A1 * | 12/2016 | Chaji | G09G 5/026 |
| 2017/0193909 | A1 * | 7/2017 | Song | G09G 3/2074 |
| 2017/0229663 | A1 | 8/2017 | Tsai | |
| 2018/0357952 | A1 * | 12/2018 | Yang | H10K 59/121 |
| 2019/0373229 | A1 * | 12/2019 | Zhang | H04M 1/0264 |
| 2020/0135147 | A1 * | 4/2020 | Tang | G09G 3/3208 |
| 2021/0043130 | A1 * | 2/2021 | Dai | G09G 3/32 |
| 2021/0082373 | A1 * | 3/2021 | Lou | G09G 5/10 |
| 2021/0248978 | A1 * | 8/2021 | Kim | G09G 3/20 |
| 2021/0390911 | A1 * | 12/2021 | Kim | G09G 3/3291 |
| 2022/0051641 | A1 * | 2/2022 | Park | H04N 5/2257 |
| 2023/0228621 | A1 * | 7/2023 | Sampsell | G09G 3/3208 345/207 |

OTHER PUBLICATIONS

Baldo, et al., "Very high-efficiency green organic light-emitting devices based on electrophosphorescence", Applied Physics Letters, Jul. 5, 1999, 4 pp., vol. 75, No. 1, American Institute of Physics, Melville, NY, USA.

Hecht, S. The visual discrimination of intensity and the Weber-Fechner law. J Gen Physiol 7, 235-267 (1924)).

* cited by examiner

DISPLAY CORRECTION SCHEME USING AN UNDER-DISPLAY CAMERA

CROSS-REFERENCE TO RELATED APPLICATIONS

This application claims priority to U.S. Patent Application Ser. No. 63/068,302, filed Aug. 20, 2020, the entire contents of which are incorporated herein by reference.

FIELD

The present invention relates to devices and techniques for actively predicting degradation of a display having organic emissive devices, such as organic light emitting diodes, using data measured from a camera below the display, along with devices and techniques including the same.

BACKGROUND

Opto-electronic devices that make use of organic materials are becoming increasingly desirable for a number of reasons. Many of the materials used to make such devices are relatively inexpensive, so organic opto-electronic devices have the potential for cost advantages over inorganic devices. In addition, the inherent properties of organic materials, such as their flexibility, may make them well suited for particular applications such as fabrication on a flexible substrate. Examples of organic opto-electronic devices include organic light emitting diodes/devices (OLEDs), organic phototransistors, organic photovoltaic cells, and organic photodetectors. For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

One application for phosphorescent emissive molecules is a full color display. Industry standards for such a display call for pixels adapted to emit particular colors, referred to as "saturated" colors. In particular, these standards call for saturated red, green, and blue pixels. Alternatively the OLED can be designed to emit white light. In conventional liquid crystal displays emission from a white backlight is filtered using absorption filters to produce red, green and blue emission. The same technique can also be used with OLEDs. The white OLED can be either a single EML device or a stack structure. Color may be measured using CIE coordinates, which are well known to the art.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

A ligand may be referred to as "photoactive" when it is believed that the ligand directly contributes to the photoactive properties of an emissive material. A ligand may be referred to as "ancillary" when it is believed that the ligand does not contribute to the photoactive properties of an emissive material, although an ancillary ligand may alter the properties of a photoactive ligand.

As used herein, and as would be generally understood by one skilled in the art, a first "Highest Occupied Molecular Orbital" (HOMO) or "Lowest Unoccupied Molecular Orbital" (LUMO) energy level is "greater than" or "higher than" a second HOMO or LUMO energy level if the first energy level is closer to the vacuum energy level. Since ionization potentials (IP) are measured as a negative energy relative to a vacuum level, a higher HOMO energy level corresponds to an IP having a smaller absolute value (an IP that is less negative). Similarly, a higher LUMO energy level corresponds to an electron affinity (EA) having a smaller absolute value (an EA that is less negative). On a conventional energy level diagram, with the vacuum level at the top, the LUMO energy level of a material is higher than the HOMO energy level of the same material. A "higher" HOMO or LUMO energy level appears closer to the top of such a diagram than a "lower" HOMO or LUMO energy level.

As used herein, and as would be generally understood by one skilled in the art, a first work function is "greater than" or "higher than" a second work function if the first work function has a higher absolute value. Because work functions are generally measured as negative numbers relative to vacuum level, this means that a "higher" work function is more negative. On a conventional energy level diagram, with the vacuum level at the top, a "higher" work function is illustrated as further away from the vacuum level in the downward direction. Thus, the definitions of HOMO and LUMO energy levels follow a different convention than work functions.

Layers, materials, regions, and devices may be described herein in reference to the color of light they emit. In general, as used herein, an emissive region that is described as producing a specific color of light may include one or more emissive layers disposed over each other in a stack.

As used herein, a "red" layer, material, region, or device refers to one that emits light in the range of about 580-700 nm or having a highest peak in its emission spectrum in that region. Similarly, a "green" layer, material, region, or device refers to one that emits or has an emission spectrum with a peak wavelength in the range of about 500-600 nm; a "blue" layer, material, or device refers to one that emits or has an emission spectrum with a peak wavelength in the range of about 400-500 nm; and a "yellow" layer, material, region, or device refers to one that has an emission spectrum with a peak wavelength in the range of about 540-600 nm. In some arrangements, separate regions, layers, materials, regions, or devices may provide separate "deep blue" and a "light blue" light. As used herein, in arrangements that provide separate "light blue" and "deep blue", the "deep blue" component refers to one having a peak emission wavelength that is at least about 4 nm less than the peak emission wavelength of the "light blue" component. Typically, a "light blue" component has a peak emission wavelength in the range of about 465-500 nm, and a "deep blue" component has a peak emission wavelength in the range of about 400-470 nm, though these ranges may vary for some configurations. Similarly, a color altering layer refers to a layer that converts or modifies another color of light to light having a wavelength as specified for that color. For example, a "red" color filter refers to a filter that results in light having a wavelength in the range of about 580-700 nm. In general, there are two classes of color altering layers: color filters that modify a spectrum by removing unwanted wavelengths of light, and color changing layers that convert photons of higher energy to lower energy. A component "of a color" refers to a component that, when activated or used, produces or otherwise emits light having a particular color as previously described. For example, a "first emissive region of a first color" and a "second emissive region of a second color different than the first color" describes two emissive regions that, when activated within a device, emit two different colors as previously described.

As used herein, emissive materials, layers, and regions may be distinguished from one another and from other structures based upon light initially generated by the material, layer or region, as opposed to light eventually emitted by the same or a different structure. The initial light generation typically is the result of an energy level change resulting in emission of a photon. For example, an organic emissive material may initially generate blue light, which may be converted by a color filter, quantum dot or other structure to red or green light, such that a complete emissive stack or sub-pixel emits the red or green light. In this case the initial emissive material or layer may be referred to as a "blue" component, even though the sub-pixel is a "red" or "green" component.

In some cases, it may be preferable to describe the color of a component such as an emissive region, sub-pixel, color altering layer, or the like, in terms of 1931 CIE coordinates. For example, a yellow emissive material may have multiple peak emission wavelengths, one in or near an edge of the "green" region, and one within or near an edge of the "red" region as previously described. Accordingly, as used herein, each color term also corresponds to a shape in the 1931 CIE coordinate color space. The shape in 1931 CIE color space is constructed by following the locus between two color points and any additional interior points. For example, interior shape parameters for red, green, blue, and yellow may be defined as shown below:

| Color | CIE Shape Parameters |
| --- | --- |
| Central Red | Locus: [0.6270, 0.3725]; [0.7347, 0.2653]; Interior: [0.5086, 0.2657] |
| Central Green | Locus: [0.0326, 0.3530]; [0.3731, 0.6245]; Interior: [0.2268, 0.3321 |

-continued

| Color | CIE Shape Parameters |
| --- | --- |
| Central Blue | Locus: [0.1746, 0.0052]; [0.0326, 0.3530]; Interior: [0.2268, 0.3321] |
| Central Yellow | Locus: [0.3731, 0.6245]; [0.6270, 0.3725]; Interior: [0.3700, 0.4087]; [0.2886, 0.4572] |

More details on OLEDs, and the definitions described above, can be found in U.S. Pat. No. 7,279,704, which is incorporated herein by reference in its entirety.

SUMMARY

According to an embodiment, an organic light emitting diode/device (OLED) is also provided. The OLED can include an anode, a cathode, and an organic layer, disposed between the anode and the cathode. According to an embodiment, the organic light emitting device is incorporated into one or more device selected from a consumer product, an electronic component module, and/or a lighting panel.

According to an embodiment, a device is provided that includes a full color display. A camera may be disposed below the full color display. The device may include a controller to modify a video signal applied to one or more sub-pixels of the full color display based on a predicted degradation of the one or more sub-pixels, such that the modification is updated by the controller based on luminance data for the one or more subpixels acquired by the camera.

The full color display may be an organic light emitting diode (OLED) display, a microLED (micro light emitting diode) display, a quantum dot display, a liquid crystal display (LCD), and/or an electrochromic display.

The controller of the device may calculate a degradation of the one or more sub-pixels over a predetermined time based on a luminance and temperature history of the one or more sub-pixels. The device may include a memory device communicatively coupled to the controller. The controller may store the luminance and temperature history of the one or more sub-pixels of the one or more sub-pixels in the memory device. The controller may calculate the degradation of the one or more sub-pixels based on a drive current history of the one or more sub-pixels. The predetermined time may be based on a frame rate of the camera, and/or a multiple of the frame rate of the camera. The controller may store the calculated degradation of the one or more sub-pixels in the memory device.

One or more pixels that are disposed in a camera region may be transparent or partially transparent, and may be configured to emit light both upwards and away from the camera and downwards toward the camera.

The controller of the device may modify the video signal applied to the one or more sub-pixels of the full color display based on the predicted degradation of the one or more sub-pixels. The controller may modify the video signal applied to the one or more sub-pixels based on a time period that the at least one image is displayed.

The controller of the device may modify the video signal when the one or more sub-pixels have degraded by an amount greater than or equal to 1%. The controller may modify the video signal when the one or more sub-pixels have degraded by an amount greater than or equal to 5%.

The controller of the device may modify the video signal applied to the one or more sub-pixels based on a luminance requirement of an image to be displayed and an aging level of one or more surrounding pixels to the one or more sub-pixels. The controller may modify the video signal applied to the one or more sub-pixels based on a luminance level of an image to be displayed.

The controller of the device may update the modification applied to the video signal for a predicted degradation based on luminance data derived from the camera at a time period equal to or greater than the display frame rate.

The device may be a consumer electronic device that is a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and/or a sign.

According to an embodiment, a method is provided that includes analyzing, at a controller, a full color display to predict a degradation based on luminance and temperature history of a first type of pixels that are configured to emit light from a top surface, and a second type of pixels that are configured as transparent pixels that are disposed over a camera that is placed under the full color display. The method may include correlating, at the controller, degradation performance of the first type of pixels and the second type of pixels. The controller may set the second type of pixels to a predetermined luminance using a predetermined drive currant at predetermined time intervals, and measuring an actual luminance using the camera. The method may include determining, at the controller, an actual degradation of the second type of pixels based on the measured actual luminance. The controller may compare the predicted degradation and the actual degradation of the second type of pixels based on a history of the second type of pixels. The method may include modifying, at the controller, the prediction for degradation of the second type of pixels based on the comparison of the comparison of the predicted degradation and the actual degradation. The method may include modifying, at the controller, the prediction for the degradation of the first type of pixels based on the correlation of the degradation performance of the first type of pixels and the second type of pixels.

The method may calculate, at the controller, the degradation performance of at least one of the first type of pixels, and/or the second type of pixels over a predetermined time based on a luminance and temperature history. The controller may calculate the degradation performance of at least one of the first type of pixels, and the second type of pixels based on a drive current history.

The method may measure the luminance by measuring the luminance of the second type of pixels using the camera based on a frame rate of the camera, and a multiple of the frame rate of the camera.

According to an embodiment, a method may include analyzing, at a controller, a full color display to predict a degradation based on luminance and temperature history of pixels that are configured as transparent pixels that are disposed over a camera that is placed under the full color display. The method may include modifying, at the controller, the predicted degradation of the transparent pixels based on the luminance and temperature history acquired by the camera for one or more of the transparent pixels.

DETAILED DESCRIPTION

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

The initial OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys. Lett., vol. 75, No. 3, 4-6 (1999) ("Baldo-II"), are incorporated by reference in their entireties. Phosphorescence is described in more detail in U.S. Pat. No. 7,279,704 at cols. 5-6, which are incorporated by reference.

Figure 1:
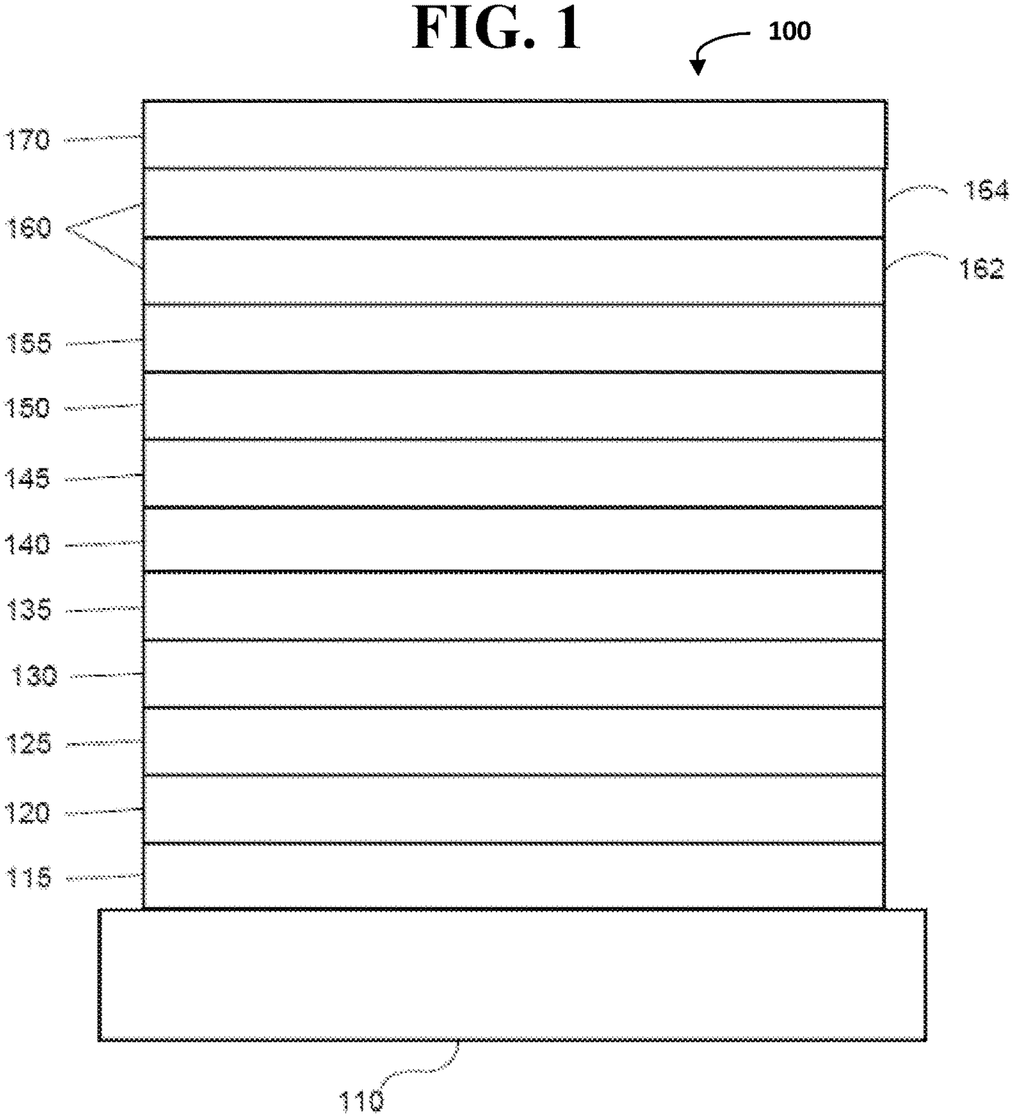
FIG. 1 shows an organic light emitting device.

FIG. 1 shows an organic light emitting device 100. The figures are not necessarily drawn to scale. Device 100 may include a substrate 110, an anode 115, a hole injection layer 120, a hole transport layer 125, an electron blocking layer 130, an emissive layer 135, a hole blocking layer 140, an electron transport layer 145, an electron injection layer 150, a protective layer 155, a cathode 160, and a barrier layer 170. Cathode 160 is a compound cathode having a first conductive layer 162 and a second conductive layer 164. Device 100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with $F_4$-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 2:
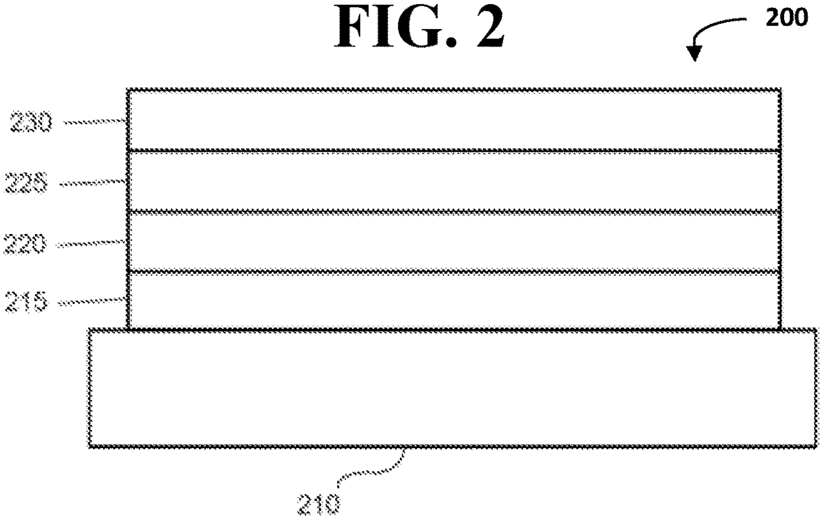
FIG. 2 shows an inverted organic light emitting device that does not have a separate electron transport layer.

FIG. 2 shows an inverted OLED 200. The device includes a substrate 210, a cathode 215, an emissive layer 220, a hole transport layer 225, and an anode 230. Device 200 may be fabricated by depositing the layers described, in order. Because the most common OLED configuration has a cathode disposed over the anode, and device 200 has cathode 215 disposed under anode 230, device 200 may be referred to as an "inverted" OLED. Materials similar to those described with respect to device 100 may be used in the corresponding layers of device 200. FIG. 2 provides one example of how some layers may be omitted from the structure of device 100.

The simple layered structure illustrated in FIGS. 1 and 2 is provided by way of non-limiting example, and it is understood that embodiments of the invention may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although many of the examples provided herein describe various layers as comprising a single material, it is understood that combinations of materials, such as a mixture of host and dopant, or more generally a mixture, may be used. Also, the layers may have various sublayers. The names given to the various layers herein are not intended to be strictly limiting. For example, in device 200, hole transport layer 225 transports holes and injects holes into emissive layer 220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 1 and 2.

Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. The OLED structure may deviate from the simple layered structure illustrated in FIGS. 1 and 2. For example, the substrate may include an angled reflective surface to improve out-coupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

In some embodiments disclosed herein, emissive layers or materials, such as emissive layer 135 and emissive layer 220 shown in FIGS. 1-2, respectively, may include quantum dots. An "emissive layer" or "emissive material" as disclosed herein may include an organic emissive material and/or an emissive material that contains quantum dots or equivalent structures, unless indicated to the contrary explicitly or by context according to the understanding of one of skill in the art. Such an emissive layer may include only a quantum dot material which converts light emitted by a separate emissive material or other emitter, or it may also include the separate emissive material or other emitter, or it may emit light itself directly from the application of an electric current. Similarly, a color altering layer, color filter, upconversion, or downconversion layer or structure may include a material containing quantum dots, though such layer may not be considered an "emissive layer" as disclosed herein. In general, an "emissive layer" or material is one that emits an initial light, which may be altered by another layer such as a color filter or other color altering layer that does not itself emit an initial light within the device, but may re-emit altered light of a different spectra content based upon initial light emitted by the emissive layer.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. Pat. No. 7,431,968, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processability than those having symmetric structures, because asymmetric materials may have a lower tendency to recrystallize. Dendrimer substituents may be used to enhance the ability of small molecules to undergo solution processing.

Devices fabricated in accordance with embodiments of the present invention may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are herein incorporated by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

In some embodiments, at least one of the anode, the cathode, or a new layer disposed over the organic emissive layer functions as an enhancement layer. The enhancement layer comprises a plasmonic material exhibiting surface plasmon resonance that non-radiatively couples to the emitter material and transfers excited state energy from the emitter material to non-radiative mode of surface plasmon polariton. The enhancement layer is provided no more than a threshold distance away from the organic emissive layer, wherein the emitter material has a total non-radiative decay rate constant and a total radiative decay rate constant due to the presence of the enhancement layer and the threshold distance is where the total non-radiative decay rate constant is equal to the total radiative decay rate constant. In some embodiments, the OLED further comprises an outcoupling layer. In some embodiments, the outcoupling layer is disposed over the enhancement layer on the opposite side of the organic emissive layer. In some embodiments, the outcoupling layer is disposed on opposite side of the emissive layer from the enhancement layer but still outcouples energy from the surface plasmon mode of the enhancement layer. The outcoupling layer scatters the energy from the surface plasmon polaritons. In some embodiments this energy is scattered as photons to free space. In other embodiments, the energy is scattered from the surface plasmon mode into other modes of the device such as but not limited to the organic waveguide mode, the substrate mode, or another waveguiding mode. If energy is scattered to the non-free space mode of the OLED other outcoupling schemes could be incorporated to extract that energy to free space. In some embodiments, one or more intervening layer can be disposed between the enhancement layer and the outcoupling layer. The examples for interventing layer(s) can be dielectric materials, including organic, inorganic, perovskites, oxides, and may include stacks and/or mixtures of these materials.

The enhancement layer modifies the effective properties of the medium in which the emitter material resides resulting in any or all of the following: a decreased rate of emission, a modification of emission line-shape, a change in emission intensity with angle, a change in the stability of the emitter material, a change in the efficiency of the OLED, and reduced efficiency roll-off of the OLED device. Placement of the enhancement layer on the cathode side, anode side, or on both sides results in OLED devices which take advantage of any of the above-mentioned effects. In addition to the specific functional layers mentioned herein and illustrated in the various OLED examples shown in the figures, the OLEDs according to the present disclosure may include any of the other functional layers often found in OLEDs.

The enhancement layer can be comprised of plasmonic materials, optically active metamaterials, or hyperbolic metamaterials. As used herein, a plasmonic material is a material in which the real part of the dielectric constant crosses zero in the visible or ultraviolet region of the electromagnetic spectrum. In some embodiments, the plasmonic material includes at least one metal. In such embodiments the metal may include at least one of Ag, Al, Au, Ir, Pt, Ni, Cu, W, Ta, Fe, Cr, Mg, Ga, Rh, Ti, Ru, Pd, In, Bi, Ca alloys or mixtures of these materials, and stacks of these materials. In general, a metamaterial is a medium composed of different materials where the medium as a whole acts differently than the sum of its material parts. In particular, we define optically active metamaterials as materials which have both negative permittivity and negative permeability. Hyperbolic metamaterials, on the other hand, are anisotropic media in which the permittivity or permeability are of different sign for different spatial directions. Optically active metamaterials and hyperbolic metamaterials are strictly distinguished from many other photonic structures such as Distributed Bragg Reflectors ("DBRs") in that the medium should appear uniform in the direction of propagation on the length scale of the wavelength of light. Using terminology that one skilled in the art can understand: the dielectric constant of the metamaterials in the direction of propagation can be described with the effective medium approximation. Plasmonic materials and metamaterials provide methods for controlling the propagation of light that can enhance OLED performance in a number of ways.

In some embodiments, the enhancement layer is provided as a planar layer. In other embodiments, the enhancement layer has wavelength-sized features that are arranged periodically, quasi-periodically, or randomly, or sub-wavelength-sized features that are arranged periodically, quasi-periodically, or randomly. In some embodiments, the wavelength-sized features and the sub-wavelength-sized features have sharp edges.

In some embodiments, the outcoupling layer has wavelength-sized features that are arranged periodically, quasi-periodically, or randomly, or sub-wavelength-sized features that are arranged periodically, quasi-periodically, or randomly. In some embodiments, the outcoupling layer may be composed of a plurality of nanoparticles and in other embodiments the outcoupling layer is composed of a plurality of nanoparticles disposed over a material. In these embodiments the outcoupling may be tunable by at least one of varying a size of the plurality of nanoparticles, varying a shape of the plurality of nanoparticles, changing a material of the plurality of nanoparticles, adjusting a thickness of the material, changing the refractive index of the material or an additional layer disposed on the plurality of nanoparticles, varying a thickness of the enhancement layer, and/or varying the material of the enhancement layer. The plurality of nanoparticles of the device may be formed from at least one of metal, dielectric material, semiconductor materials, an alloy of metal, a mixture of dielectric materials, a stack or layering of one or more materials, and/or a core of one type of material and that is coated with a shell of a different type of material. In some embodiments, the outcoupling layer is composed of at least metal nanoparticles wherein the metal is selected from the group consisting of Ag, Al, Au, Ir, Pt, Ni, Cu, W, Ta, Fe, Cr, Mg, Ga, Rh, Ti, Ru, Pd, In, Bi, Ca, alloys or mixtures of these materials, and stacks of these materials. The plurality of nanoparticles may have additional layer disposed over them. In some embodiments, the polarization of the emission can be tuned using the outcoupling layer. Varying the dimensionality and periodicity of the outcoupling layer can select a type of polarization that is preferentially outcoupled to air. In some embodiments the outcoupling layer also acts as an electrode of the device.

It is believed that the internal quantum efficiency (IQE) of fluorescent OLEDs can exceed the 25% spin statistics limit through delayed fluorescence. As used herein, there are two types of delayed fluorescence, i.e. P-type delayed fluorescence and E-type delayed fluorescence. P-type delayed fluorescence is generated from triplet-triplet annihilation (TTA).

On the other hand, E-type delayed fluorescence does not rely on the collision of two triplets, but rather on the thermal population between the triplet states and the singlet excited states. Compounds that are capable of generating E-type delayed fluorescence are required to have very small singlet-triplet gaps. Thermal energy can activate the transition from the triplet state back to the singlet state. This type of delayed fluorescence is also known as thermally activated delayed fluorescence (TADF). A distinctive feature of TADF is that the delayed component increases as temperature rises due to the increased thermal energy. If the reverse intersystem crossing rate is fast enough to minimize the non-radiative decay from the triplet state, the fraction of back populated singlet excited states can potentially reach 75%. The total singlet fraction can be 100%, far exceeding the spin statistics limit for electrically generated excitons.

E-type delayed fluorescence characteristics can be found in an exciplex system or in a single compound. Without being bound by theory, it is believed that E-type delayed fluorescence requires the luminescent material to have a small singlet-triplet energy gap (ΔES-T). Organic, non-metal containing, donor-acceptor luminescent materials may be able to achieve this. The emission in these materials is often characterized as a donor-acceptor charge-transfer (CT) type emission. The spatial separation of the HOMO and LUMO in these donor-acceptor type compounds often results in small ΔES-T. These states may involve CT states. Often, donor-acceptor luminescent materials are constructed by connecting an electron donor moiety such as amino- or carbazole-derivatives and an electron acceptor moiety such as N-containing six-membered aromatic ring.

Devices fabricated in accordance with embodiments of the invention can be incorporated into a wide variety of electronic component modules (or units) that can be incorporated into a variety of electronic products or intermediate components. Examples of such electronic products or intermediate components include display screens, lighting devices such as discrete light source devices or lighting panels, etc. that can be utilized by the end-user product manufacturers. Such electronic component modules can optionally include the driving electronics and/or power source(s). Devices fabricated in accordance with embodiments of the invention can be incorporated into a wide variety of consumer products that have one or more of the electronic component modules (or units) incorporated therein. A consumer product comprising an OLED that includes the compound of the present disclosure in the organic layer in the OLED is disclosed. Such consumer products would include any kind of products that include one or more light source(s) and/or one or more of some type of visual displays. Some examples of such consumer products include a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and a sign. Various control mechanisms may be used to control devices fabricated in accordance with the present invention, including passive matrix and active matrix. Many of the devices are intended for use in a temperature range comfortable to humans, such as 18 C to 30 C, and more preferably at room temperature (20-25 C), but could be used outside this temperature range, for example, from −40 C to 80 C.

The materials and structures described herein may have applications in devices other than OLEDs. For example, other optoelectronic devices such as organic solar cells and organic photodetectors may employ the materials and structures. More generally, organic devices, such as organic transistors, may employ the materials and structures.

In some embodiments, the OLED has one or more characteristics selected from the group consisting of being flexible, being rollable, being foldable, being stretchable, and being curved. In some embodiments, the OLED is transparent or semi-transparent. In some embodiments, the OLED further comprises a layer comprising carbon nanotubes.

In some embodiments, the OLED further comprises a layer comprising a delayed fluorescent emitter. In some embodiments, the OLED comprises a RGB pixel arrangement or white plus color filter pixel arrangement. In some embodiments, the OLED is a mobile device, a hand held device, or a wearable device. In some embodiments, the OLED is a display panel having less than 10 inch diagonal or 50 square inch area. In some embodiments, the OLED is a display panel having at least 10 inch diagonal or 50 square inch area. In some embodiments, the OLED is a lighting panel.

In some embodiments of the emissive region, the emissive region further comprises a host.

In some embodiments, the compound can be an emissive dopant. In some embodiments, the compound can produce emissions via phosphorescence, fluorescence, thermally activated delayed fluorescence, i.e., TADF (also referred to as E-type delayed fluorescence), triplet-triplet annihilation, or combinations of these processes.

The OLED disclosed herein can be incorporated into one or more of a consumer product, an electronic component module, and a lighting panel. The organic layer can be an emissive layer and the compound can be an emissive dopant in some embodiments, while the compound can be a non-emissive dopant in other embodiments.

The organic layer can also include a host. In some embodiments, two or more hosts are preferred. In some embodiments, the hosts used maybe a) bipolar, b) electron transporting, c) hole transporting or d) wide band gap materials that play little role in charge transport. In some embodiments, the host can include a metal complex. The host can be an inorganic compound.

Combination with Other Materials

The materials described herein as useful for a particular layer in an organic light emitting device may be used in combination with a wide variety of other materials present in the device. For example, emissive dopants disclosed herein may be used in conjunction with a wide variety of hosts, transport layers, blocking layers, injection layers, electrodes and other layers that may be present. The materials described or referred to below are non-limiting examples of materials that may be useful in combination with the compounds disclosed herein, and one of skill in the art can readily consult the literature to identify other materials that may be useful in combination.

Various materials may be used for the various emissive and non-emissive layers and arrangements disclosed herein. Examples of suitable materials are disclosed in U.S. Patent Application Publication No. 2017/0229663, which is incorporated by reference in its entirety.

Conductivity Dopants:

A charge transport layer can be doped with conductivity dopants to substantially alter its density of charge carriers, which will in turn alter its conductivity. The conductivity is increased by generating charge carriers in the matrix material, and depending on the type of dopant, a change in the Fermi level of the semiconductor may also be achieved. Hole-transporting layer can be doped by p-type conductivity dopants and n-type conductivity dopants are used in the electron-transporting layer.

HIL/HTL:

A hole injecting/transporting material to be used in the present invention is not particularly limited, and any compound may be used as long as the compound is typically used as a hole injecting/transporting material.

EBL:

An electron blocking layer (EBL) may be used to reduce the number of electrons and/or excitons that leave the emissive layer. The presence of such a blocking layer in a device may result in substantially higher efficiencies, and or longer lifetime, as compared to a similar device lacking a blocking layer. Also, a blocking layer may be used to confine emission to a desired region of an OLED. In some embodiments, the EBL material has a higher LUMO (closer to the vacuum level) and/or higher triplet energy than the emitter closest to the EBL interface. In some embodiments, the EBL material has a higher LUMO (closer to the vacuum level) and or higher triplet energy than one or more of the hosts closest to the EBL interface. In one aspect, the compound used in EBL contains the same molecule or the same functional groups used as one of the hosts described below.

Host:

The light emitting layer of the organic EL device of the present invention preferably contains at least a metal complex as light emitting material, and may contain a host material using the metal complex as a dopant material. Examples of the host material are not particularly limited, and any metal complexes or organic compounds may be used as long as the triplet energy of the host is larger than that of the dopant. Any host material may be used with any dopant so long as the triplet criteria is satisfied.

HBL:

A hole blocking layer (HBL) may be used to reduce the number of holes and/or excitons that leave the emissive layer. The presence of such a blocking layer in a device may result in substantially higher efficiencies and/or longer lifetime as compared to a similar device lacking a blocking layer. Also, a blocking layer may be used to confine emission to a desired region of an OLED. In some embodiments, the HBL material has a lower HOMO (further from the vacuum level) and or higher triplet energy than the emitter closest to the HBL interface. In some embodiments, the HBL material has a lower HOMO (further from the vacuum level) and or higher triplet energy than one or more of the hosts closest to the HBL interface.

ETL:

An electron transport layer (ETL) may include a material capable of transporting electrons. The electron transport layer may be intrinsic (undoped), or doped. Doping may be used to enhance conductivity. Examples of the ETL material are not particularly limited, and any metal complexes or organic compounds may be used as long as they are typically used to transport electrons.

Charge Generation Layer (CGL)

In tandem or stacked OLEDs, the CGL plays an essential role in the performance, which is composed of an n-doped layer and a p-doped layer for injection of electrons and holes, respectively. Electrons and holes are supplied from the CGL and electrodes. The consumed electrons and holes in the CGL are refilled by the electrons and holes injected from the cathode and anode, respectively; then, the bipolar currents reach a steady state gradually. Typical CGL materials include n and p conductivity dopants used in the transport layers.

Emissive displays may be based on light emitting devices whose performance often degrade over time with use. Differential changes in the degradation of red, green and/or blue pixel or sub-pixel arrangements (or other pixel color arrangements) can lead to incorrect rendering of colors in the display image. Changes in the performance of an AMOLED (Active Matrix Organic Light Emitting Diode) backplane can lead to changes or reductions in the apparent light output of one or more OLED sub-pixels over time. Correction schemes have been proposed which adjust the drive current to degraded pixels to compensate for their degradation. These schemes are typically based on either measuring (e.g., using external circuitry) the current flow through an OLED device at a given data voltage, or by using predictive algorithms which require accurate information on pixel behavior over time, based on luminance, temperature, and other profiles. Such schemes are often subject to errors which increase over time. Typical schemes can also include measurement-based algorithms, which require additional hardware to be added to the display to measure and characterize the display pixels over time. Such predictive schemes add cost and complexity to the display manufacturing process. The schemes using external circuitry do not account for changes in luminous efficiency of an OLED device over time.

Next generation OLED phones and other devices may have cameras integrated under the display to allow for close to 100% fill-factor designs (i.e., the ratio of a display area to the phone body). Embodiments of the disclosed subject matter provide for a camera disposed under a display to update a predictive algorithm used to calculate pixel degradation over time. Embodiments of the disclosed subject matter more fully and accurately account for the performance of the OLED devices used in a device, and their usage history over time.

Present compensation schemes, where sub-pixel currents in a display, are adjusted to account of their performance degradation over time. The degradation can either be measured or predicted based on the measured behavior of devices which are believed to be very similar to those used in the display under use. Measuring sub-pixel degradation is the most accurate way to determine compensation. To date, such measurement has required custom hardware to be integrated into the display or its driving electronics, which increases cost and complexity. Predictive schemes are typically simpler, as they only require software to apply compensation. However, such schemes rely on accurate predictions of very complex degradation mechanisms, and their dependencies on luminance, temperature, and the like over long periods of time. With such schemes, increasing errors typically accrue over time.

Embodiments of the disclosed subject matter combine a predictive compensation scheme with the accuracy of a measured scheme, without introducing additional hardware.

Embodiments of the disclosed subject matter provide accurate correction to emissive displays (OLED displays, LED displays, quantum dot displays, and the like) to account for their emissive elements having performances which change/degrade over time, particularly with drive current (usually degradation depends on luminance to a power x, where x is typically between 1 and 2, and is accelerated by elevated operating temperatures. Embodiments of the disclosed subject matter account for degradation in the performance of a backplane circuit which may drive one or more of the sub-pixels of a display.

Embodiments of the disclosed subject matter provide a predictive simulator which may calculate the degradation for each sub-pixel (or group of same color sub-pixels) over time based on the luminance and temperature history of each sub-pixel (or group of same color sub-pixels).

OLED degradation has been characterized as a stretched exponential function with respect to time, with an exponential temperature dependence. One may determine the pixel luminance L, for a fixed drive current, in terms of its luminance ($L_0$) at t=0, $$\text{such that } L/L_0=\exp(-t/\tau(I))^{\beta}\cdot\exp(-T/T_0) \quad (1)$$

where T is a temperature and $T_0$ is a characteristic temperature, and $\tau$ is as characteristic time constant which is dependent on drive current (I), and $\beta$ a factor that relates to the stretched exponential behavior.

Figure 3:
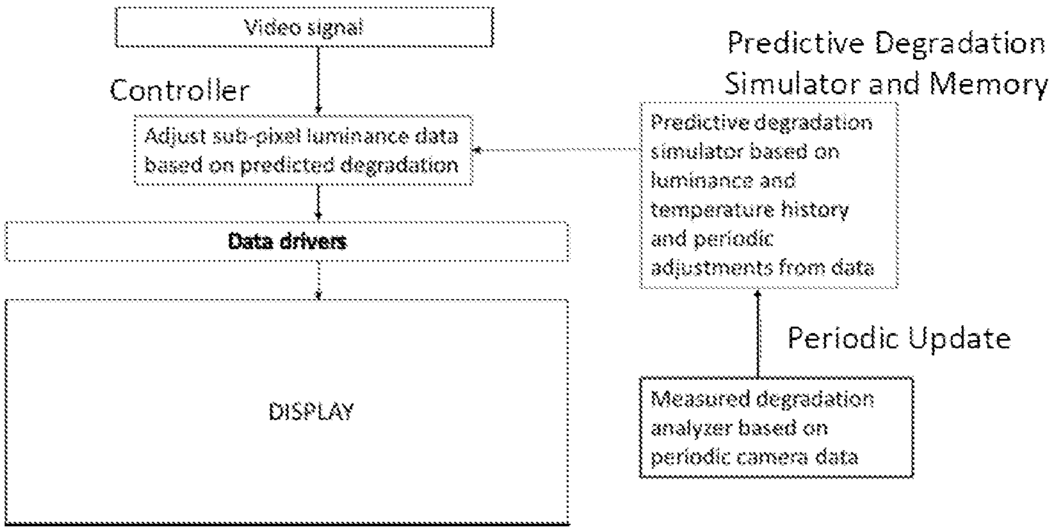
FIG. 3 shows an example device having pixel correction according to an embodiment of the disclosed subject matter.

For each time interval, which may be equal to the frame rate or a multiple of the frame rate of a camera, the degradation for that time interval may be calculated based on a pixel's drive current and temperature during that time interval. As shown in FIG. 3, this information may be stored in a memory that may be part of the predictive degradation simulator. This information may be continuously updated based on usage over time, and the new degradation may be calculated using equation (1). The parameters $\tau$, $\beta$ and $T_0$ may be found by fitting equation (1) to experimental degradation data obtained from representative devices whose performance is believed to be similar and/or "identical" to the devices implemented in the display of interest.

The equation (1) is one expression of OLED degradation. Other models, equations, and/or variations on equation 1 may be employed to predict pixel degradation behavior (e.g., display device degradation behavior).

Embodiments of the disclosed subject matter may correct the predictive algorithms based on measured data. Without this correction, predictive corrections typically become more inaccurate over time, as errors between the prediction and actual degradation grow. Embodiments of the disclosed subject matter uses a camera placed under a display in various consumer products. Embodiments of the disclosed subject matter provide real time correction to the predictive simulator with no additional hardware requirements, when the product includes a camera disposed below the display.

Under display cameras being developed so that the display area does not need to be reduced to allow for a camera to be integrated into a device. As most displays are non-transparent, a special pixel arrangement may be employed for a portion of the display that covers the camera lens, so light from the outside world can reach the camera. A transparent OLED may be disposed over the camera aperture. Generally, this portion of the display may be of a lower resolution than a main portion of the display. This portion may increase its transparency, while not appearing objectionable to the user in terms of having a different optical appearance than the rest of the display. As pixels in the camera region of the display are transparent, they may emit light both up towards the user and down towards the camera. The camera may measure the pixel luminances over time of the transparent pixels. The measured pixel luminances over time may be used to determine the efficiency and/or degradation over time. A display may be fabricated with an under panel camera using pixels over the camera area that have the same resolution as those used in the remainder of the display. A display may be fabricated where all pixels are transparent and are uniform across the display.

As used throughout, a transparent pixel may allow at least 10%, at least 20%, at least 30%, at least 40%, at least 50%, at least 70%, at least 80%, or the like of incident light though the pixel. A partially transparent pixel may allow less than 10%, less than 20%, less than 30%, less than 50%, or the like of incident light through the pixel.

Embodiments of the disclosed subject matter may provide predicted degradation based on the simulator and equation (1) described above, and the measured degradation based on camera data. At periodic time intervals, the parameters used in equation (1) may be used to predict the degradation can be adjusted to match the measured data, so that errors in the predictive simulator can be reduced and/or eliminated.

Using representative devices fabricated including the embodiments discussed above and by using similar and/or the same manufacturing methods, the degradation of non-transparent on the same array with transparent pixels on that array pixels may be correlated so that the measured data (i.e., data captured by the camera) may be used to update the predictive algorithm to calculate non-transparent pixel performance.

Figure 4:
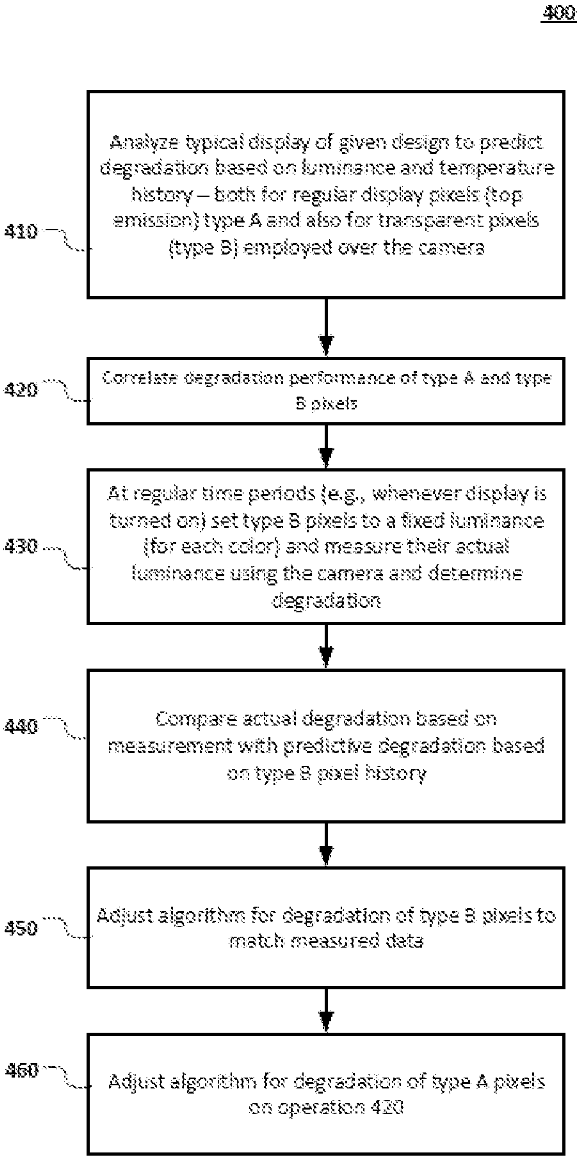
FIG. 4 shows an example method of updating a predictive degradation simulation using a camera according to an embodiment of the disclosed subject matter.

An example of this prediction of degradation and updates to the prediction may be shown in the method 400 of FIG. 4. At operation 410, the controller (e.g., the controller of FIG. 3) may analyze a display of given design to predict degradation based on luminance and temperature history. The analysis may be for both regular display pixels (e.g., top emission) type A and also for transparent pixels (type B) disposed over the camera. At operation 420, the controller may correlate the degradation performance of the type A (top emission) and type B (transparent) pixels. At regular periods (e.g., whenever the display is turned on), the controller may set type B pixels to a predetermined luminance for each color, may measure their luminance using the camera, and may determine the degradation at operation 430. At operation 440, the controller may compare the actual degradation based on the measurement (e.g., measured luminance of the type B pixels) with a predictive degradation based on the type B pixel history. In some embodiments, the type B pixel history may be stored in a memory device (e.g., the memory shown in FIG. 3). At operation 450, the controller may adjust an algorithm for degradation for degradation of the type B pixels to match the measured data (e.g., the measured luminance of the type B pixels). At operation 460, the controller may adjust the algorithm for degradation of type A pixels at operation 420. In some embodiments, the algorithm for degradation may be stored in a memory communicatively coupled to the controller. When a display includes only type B transparent pixels, operations 420, 430, 440, 450, and/or 460 need not be performed.

In some embodiments, the correction scheme be image dependent. Differential aging of pixels within a display with a long duration device operation with static images (e.g., a logo or static picture) may result in the visible persistence of an image. Brightness differences of approximately 2% may be perceivable between neighboring pixels, resulting in the appearance of 'burn-in'. For some images, a brightness difference of 5% may result in a visible change in the color of an image. In an embodiment of the disclosed subject matter, the 'static' images may receive full correction. Video images may receive partial correction so as to not increase their drive currents more than necessary to achieve acceptable visual performance, so as to extend pixel lifetime. In some embodiments, sub-pixel correction may not be applied until a pixel has degraded by an amount which can be visually noticed, e.g. ≥2% or ≥5%. Thereafter, compensation may be applied to bring the subpixel to this ≥2% level. The value of the level of compensation may be image dependent, as video images may allow for a higher number than static images. The application and degree of the correction scheme disclosed herein may depends on the degree of degradation in the pixel being addressed, and/or on the image luminance requirements and aging level of the surrounding pixels. For example, in a static image where the pixel is determined to have aged by 4% and the surrounding pixels have aged by 3%, then no correction may be necessary. In contrast, if the surrounding pixels have aged by 1%, then the correction scheme described above may be applied. That is, the application of the correction scheme may be dependent on the difference in aging between neighboring pixels (dL).

In some embodiments, the application of the correction scheme may be dependent on a grey scale (i.e., the luminance level of an image). If there is a low luminance and/or low grey scale image (e.g., an image with a luminance or grey scale level below a predetermined threshold level), then the degree of correction may be lessened. In some embodiments, the degree of correction may be lessened if other areas of the display may be simultaneously showing higher luminance content. Conversely, if the application is being used in a high brightness environment (e.g., in a bright daylight application, such with an augmented reality (AR) application), then the correction scheme may be omitted.

In some embodiments, a camera and/or light sensor may measure the pixel output to determine pixel degradation by monitoring a waveguided emission from the OLED sub-pixels. In order to detect the waveguided light, a scattering medium, reflective optical element, and/or mirror may be disposed on one or more sides of each sub-pixel. Such scattering media, reflective optical elements, and/or mirrors may be embedded in a grid material used to define the sub-pixel areas and/or sides.

Embodiments of the disclosed subject matter may provide a device that includes a full color display. A camera may be disposed below the full color display. The full color display of the device may be an organic light emitting diode (OLED) display, a microLED (micro light emitting diode) display, a quantum dot display, a liquid crystal display (LCD), and/or an electrochromic display. The device may include a controller (e.g., as shown in FIG. 3) to modify a video signal applied to one or more sub-pixels of the full color display based on a predicted degradation of the one or more sub-pixels. The modification may be updated by the controller based on luminance data for the one or more subpixels acquired by the camera.

The controller of the device may calculate a degradation of the one or more sub-pixels over a predetermined time based on a luminance and temperature history of the one or more sub-pixels. The device may include a memory device (e.g., the memory shown in FIG. 3) communicatively coupled to the controller. The controller may store the luminance and temperature history of the one or more sub-pixels of the one or more sub-pixels in the memory device. The controller may calculate the degradation of the one or more sub-pixels based on a drive current history of the one or more sub-pixels. The predetermined time may be based on a frame rate of the camera, and/or a multiple of the frame rate of the camera. The controller may store the calculated degradation of the one or more sub-pixels in the memory device.

One or more pixels that are disposed in a camera region may be transparent or partially transparent and may be configured to emit light both upwards and away from the camera and downwards toward the camera. As used herein, a transparent pixel may allow at least 10%, at least 20%, at least 30%, at least 40%, at least 50%, at least 70%, at least 80%, or the like of light though the pixel. A partially transparent pixel may allow less than 10%, less than 20%, less than 30%, less than 50% or the like through the pixel.

The controller of the device (e.g., as shown in FIG. 3) may modify the video signal applied to the one or more sub-pixels of the full color display based on the predicted degradation of the one or more sub-pixels. The controller may modify the video signal applied to the one or more sub-pixels based on a time period that the at least one image is displayed.

The controller of the device may modify the video signal when the one or more sub-pixels have degraded by an amount greater than or equal to 1%, or greater than or equal to 5%. In some embodiments, the controller of the device may modify the video signal when the one or more sub-pixels have degraded by an amount greater than or equal to 2%, 3%, 10%, 20%, and the like.

The controller of the device may modify the video signal applied to the one or more sub-pixels based on a luminance requirement of an image to be displayed and an aging level of one or more surrounding pixels to the one or more sub-pixels. The controller may modify the video signal applied to the one or more sub-pixels based on a luminance level of an image to be displayed.

The controller of the device (e.g., as shown in FIG. 3) may update the modification applied to the video signal for a predicted degradation based on luminance data derived from the camera at a time period equal to or greater than the display frame rate.

The device may be a consumer electronic device, and may be a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and/or a sign.

In embodiments of the disclosed subject matter, a method may be provided that includes analyzing, at a controller (e.g., as shown in FIG. 3), a full color display to predict a degradation based on luminance and temperature history of a first type of pixels that are configured to emit light from a top surface, and a second type of pixels that are configured as transparent pixels that are disposed over a camera that is placed under the full color display. The controller may correlate the degradation performance of the first type of pixels and the second type of pixels. The controller may set the second type of pixels to a predetermined luminance using a predetermined drive current at predetermined time intervals, and measure an actual luminance using the camera. The controller may determine an actual degradation of the second type of pixels based on the measured actual luminance. The controller may compare the predicted degradation and the actual degradation of the second type of pixels based on a history of the second type of pixels. The controller may modify the prediction for degradation of the second type of pixels based on the comparison of the comparison of the predicted degradation and the actual degradation. The controller may modify the prediction for the degradation of the first type of pixels based on the correlation of the degradation performance of the first type of pixels and the second type of pixels.

The method may calculate, at the controller, the degradation performance of at least one of the first type of pixels, and/or the second type of pixels over a predetermined time based on a luminance and temperature history. The controller may calculate the degradation performance of at least one of the first type of pixels, and the second type of pixels based on a drive current history.

The method may measure the luminance by measuring the luminance of the second type of pixels using the camera based on a frame rate of the camera, and/or a multiple of the frame rate of the camera.

Embodiments of the disclosed subject matter may provide a method that includes analyzing, at a controller, a full color display to predict a degradation based on luminance and temperature history of pixels that are configured as transparent pixels that are disposed over a camera that is placed under the full color display. The method may include modifying, at the controller, the predicted degradation of the transparent pixels based on the luminance and temperature history acquired by the camera for one or more of the transparent pixels.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

We claim:

1. A device comprising:

a full color display comprising a plurality of pixels which have regions that are configured to emit light to render an image including a first type of pixels that are non-transparent and a second type of pixels that cover a camera lens and are transparent or semi-transparent, wherein each pixel has one or more sub-pixels;

a camera including the camera lens is disposed below the full color display configured to directly receive light emitted from the one or more sub-pixels of at least one of the plurality of the second type of pixels with the transparent or semi-transparent regions which cover the camera lens that are configured to emit the light both towards the camera lens and away from the camera, wherein the camera is configured to measure luminance for the one or more sub-pixels of the second type of pixels based on the light directly received from the sub-pixel being measured; and a controller that correlates degradation performance of the first and second type of pixels, and modifies a video signal applied to at least one of the sub-pixels of the full color display that is visible to the camera and to at least one of the sub-pixels that is not visible by the camera based on a predicted degradation of the one or more sub-pixels that are above the camera, such that the modification is updated by the controller based on updated luminance data for the one or more sub-pixels acquired by the camera.

2. The device of claim 1, where in the full color display comprises at least one selected from the group consisting of: an organic light emitting diode (OLED) display, a microLED (micro light emitting diode) display, a quantum dot display, a liquid crystal display (LCD), and an electrochromic display.

3. The device of claim 1, wherein the controller calculates a degradation of the one or more sub-pixels over a predetermined time based on a luminance and temperature history of the one or more sub-pixels.

4. The device of claim 3, further comprising a memory device communicatively coupled to the controller, wherein the controller stores the luminance and temperature history of the one or more sub-pixels of the one or more sub-pixels in the memory device.

5. The device of claim 3, wherein the controller calculates the degradation of the one or more sub-pixels based on a drive current history of the one or more sub-pixels.

6. The device of claim 3, wherein the predetermined time is based on at least one selected from the group consisting of: a frame rate of the camera, and a multiple of the frame rate of the camera.

7. The device of claim 1, wherein the controller modifies the video signal applied to the one or more sub-pixels of the full color display based on the predicted degradation of the one or more sub-pixels.

8. The device of claim 7, wherein the controller modifies the video signal applied to the one or more sub-pixels based on a time period that the at least one image is displayed.

9. The device of claim 1, wherein the controller modifies the video signal when the one or more sub-pixels have degraded by an amount greater than or equal to 1%.

10. The device of claim 1, wherein the controller modifies the video signal when the one or more sub-pixels have degraded by an amount greater than or equal to 5%.

11. The device of claim 1, wherein the controller modifies the video signal applied to the one or more sub-pixels based on a luminance requirement of an image to be displayed and an aging level of one or more surrounding pixels to the one or more sub-pixels.

12. The device of claim 1, wherein the controller modifies the video signal applied to the one or more sub-pixels based on a luminance level of an image to be displayed.

13. The device of claim 1, wherein controller updates the modification applied to the video signal for a predicted degradation based on luminance data derived from the camera at a time period equal to or greater than the display frame rate.

14. The device of claim 1, wherein the device is a consumer electronic device that is at least one type selected from the group consisting of: a flat panel display, a curved display, a computer monitor, a medical monitor, a television, a billboard, a light for interior or exterior illumination and/or signaling, a heads-up display, a fully or partially transparent display, a flexible display, a rollable display, a foldable display, a stretchable display, a laser printer, a telephone, a cell phone, tablet, a phablet, a personal digital assistant (PDA), a wearable device, a laptop computer, a digital camera, a camcorder, a viewfinder, a micro-display that is less than 2 inches diagonal, a 3-D display, a virtual reality or augmented reality display, a vehicle, a video walls comprising multiple displays tiled together, a theater or stadium screen, and a sign.

15. The device of claim 1, wherein the display includes a first group of pixels and a second group of pixels of the plurality of pixels, wherein the second group of pixels has a higher resolution than the first group of pixels.

16. A method comprising:

analyzing, at a controller, a full color display to predict a degradation based on luminance and temperature history of a first type of pixels that are configured to emit light from a top surface away from a camera including a camera lens that is placed under the full color display wherein the first type of pixels are non-transparent, and a second type of pixels that are configured as transparent pixels that are disposed over the camera that is placed under the full color display, wherein the first type of pixels are configured to emit light from a top surface away from the camera, wherein the second pixels are configured to emit light away from the camera and also towards the camera, and wherein the camera is configured to receive light directly from one or more sub-pixels that are in optical communication with the camera lens of at least the second type of pixels;

correlating, at the controller, degradation performance of the first type of pixels and the second type of pixels;

setting, at the controller, the second type of pixels to a predetermined luminance using a predetermined drive current at predetermined time intervals, and measuring an actual luminance for the one or more sub-pixels of the second type of pixels based on the light directly received from the sub-pixel being measured using the camera;

determining, at the controller, an actual degradation of the second type of pixels based on the measured actual luminance for the one or more sub-pixels of the second type of pixels acquired by the camera;

comparing, at the controller, the predicted degradation and the actual degradation of the second type of pixels based on a history of the second type of pixels;

modifying, at the controller, the prediction for degradation of the second type of pixels based on the comparison of the comparison of the predicted degradation and the actual degradation; and modifying, at the controller, the prediction for the degradation of the first type of pixels based on the correlation of the degradation performance of the first type of pixels and the second type of pixels.

17. The method of claim 16, further comprising:

calculating, at the controller, the degradation performance of at least one selected from the group consisting of: the first type of pixels, and the second type of pixels over a predetermined time based on a luminance and temperature history.

18. The method of claim 16, further comprising:

calculating, at the controller, the degradation performance of at least one selected from the group consisting of: the first type of pixels, and the second type of pixels based on a drive current history.

19. The method of claim 16, wherein the measuring the luminance comprises:

measuring the luminance of the second type of pixels using the camera based on at least one selected from the group consisting of: a frame rate of the camera, and a multiple of the frame rate of the camera.

20. A method comprising:

analyzing, at a controller, a full color display to predict a degradation based on luminance and temperature history of one or more sub-pixels of pixels that include first type of pixels that are configured to be non-transparent and a second type of pixels that are configured as transparent pixels that are disposed over a camera having a camera lens that is placed under the full color display, wherein the first type of pixels are configured to emit light from a top surface away from the camera, wherein the second type of pixels are configured to emit light both towards and away from the camera, wherein the one or more sub-pixels are in optical communication with the camera lens, and wherein the camera is configured to measure luminance for the one or more sub-pixels of the second type of pixels based on the light directly received from the sub-pixel being measured;

correlating, at the controller, degradation performance of the first type of pixels and the second type of pixels;

modifying, at the controller, the predicted degradation of the first type of pixels that are the transparent pixels based on the measured luminance and thermal temperature history acquired by the camera for one or more sub-pixels of the second type of pixels that are the transparent pixels; and modifying, at the controller, a video signal applied to at least one pixel of the full color display that is not visible by the camera and at least one of the transparent pixels based on the modified predicted degradation.

* * * * *